United States Patent [19]

Lemaire et al.

[11] Patent Number: 5,602,340
[45] Date of Patent: Feb. 11, 1997

[54] SELECTIVE PRESSURE TAP FOR A PRESSURE DETECTOR

[75] Inventors: Christian Lemaire, Nanterre; François Kalaydjian, Rueil-Malmaison, both of France

[73] Assignee: Institut Francais, du Petrole, Rueil Malmaison, France

[21] Appl. No.: 575,042

[22] Filed: Dec. 19, 1995

[30] Foreign Application Priority Data

Dec. 19, 1994 [FR] France .................. 94 15376

[51] Int. Cl.⁶ .................................. G01L 7/00
[52] U.S. Cl. ........................... 73/756; 73/866.5
[58] Field of Search ................... 73/756, 28.03, 73/29.03, 30.02, 31.04, 438, 54.06, 54.09, 54.14, 61.78, 64.45, 866.5, DIG. 9

[56] References Cited

U.S. PATENT DOCUMENTS

| | | | |
|---|---|---|---|
| 4,252,126 | 2/1981 | Mand | 73/756 X |
| 5,076,108 | 12/1991 | Trimarchi | 73/866.5 |
| 5,186,055 | 2/1993 | Kovacich et al. | 73/756 X |
| 5,331,845 | 7/1994 | Bals et al. | 73/61.43 |
| 5,394,745 | 3/1995 | Freeman | 73/756 X |

FOREIGN PATENT DOCUMENTS 0247543 12/1987 European Pat. Off. .

OTHER PUBLICATIONS

Patent Abstracts of Japan, vol. 9, No. 101 (P–353) May 2, 1985.

*Primary Examiner*—Hezron E. Williams
*Assistant Examiner*—Joseph L. Felber
*Attorney, Agent, or Firm*—Antonelli, Terry, Stout & Kraus, LLP

[57] ABSTRACT

A selective pressure tap is used for measuring, at a point of a porous sample containing at least two distinct fluids such as water and oil for example and placed in a case or sheath, the pressure exerted selectively by one of the fluids. It comprises a body provided with a central channel that is externally threaded over part of its length so as to be screwed into a hole provided through the sheath. The body of the pressure tap comprises a ferrule externally provided with 0-ring seals. The end face of the ferrule is suited for pressing closely against the wall of the sample, during the screwing operation, one or several semipermeable membranes permeable to the fluid in question. The central channel communicates with a pressure detector through a pipe.

5 Claims, 1 Drawing Sheet

U.S. Patent
Feb. 11, 1997
5,602,340
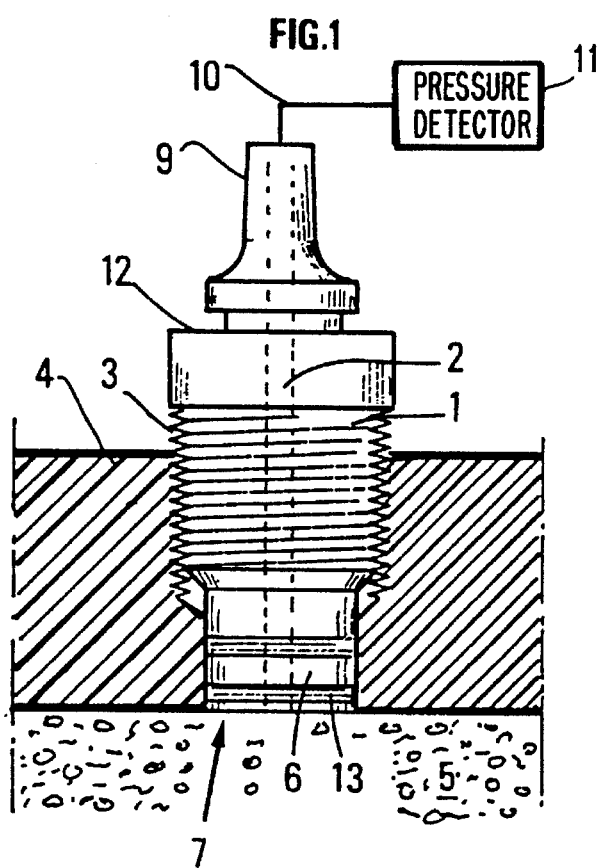
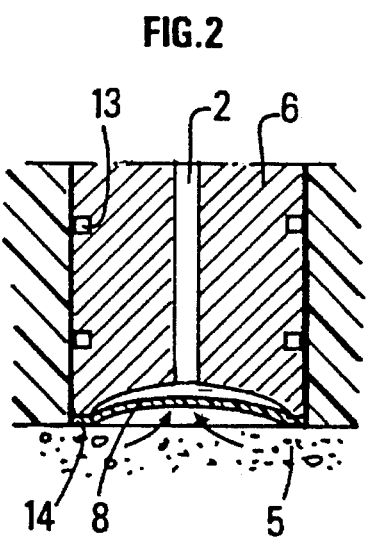

SELECTIVE PRESSURE TAP FOR A PRESSURE DETECTOR

FIELD OF THE INVENTION

The present invention relates to a selective pressure tap for selectively applying to an appropriate pressure detector pressure of a fluid in a sample of a porous material containing at least two distinct fluids such as water and oil, for example.

The pressure tap according to the invention can be used, for example, in laboratories where geologic samples are tested and measured, notably for measuring capillary pressures of fluids in porous media.

BACKGROUND OF THE INVENTION

The knowledge that can be acquired concerning various petrophysical parameters of rocks during drainage or imbibition phases can be used, for example, for selecting the most appropriate fluid for displacing the petroleum hydrocarbons, the works contain and for improving thereby the efficiency of oil enhanced recovery processes in a reservoir.

It is known to determine, for example, the saturation and the wettability of rocks with respect to fluids such as the water (in the form of brine) and the oil that can be contained therein. To that effect, rock drainage phases are carried out, i.e. a displacement of the fluids intended to decrease the water saturation, followed by imbibition phases which, on the contrary, are intended to increase its water saturation (Sw). Devices for measuring petrophysical parameters of rocks are described, for example, in patent applications FR-2,603,040, EN-93/09,481 or EN-94/10,783 or in U.S. Pat. Nos. 4,868,751 or 5,069,065.

In order to measure the capillary pressure at a point of a porous sample in the presence of two fluids in the continuous phase (water and oil for example), that is defined as the difference Pc at equilibrium between the pressure P(oil) and the pressure P(water), one has to be able to measure these two pressures separately. Existing pressure taps do not allow selective pressure tappings to be performed in a dynamic flow of two fluids.

SUMMARY OF THE INVENTION

The pressure tap according to the invention applies selectively to a pressure detector the pressure of at least one particular fluid located in a solid sample having a certain porosity and saturated with the particular fluid, and at least one other fluid, the sample being contained in a sealed case or sheath.

The top comprises an elongated body provided with an axial channel, fastening means (a part externally provided with a thread for example) for securing the body in a hole provided through the sheath containing the sample, and connection means connecting the axial channel to a pressure detector. The body also comprises a ferrule provided with seal means, suited for pressing against a wall of the sample, a semipermeable membrane permeable to they particular fluid.

According to an embodiment, the ferrule comprises a concave end face whose peripheral part is suited for pressing the membrane closely against a wall of the sample, so as to prevent any peripheral fluid leakage.

According to an advantageous embodiment, the semipermeable membrane can consist of several superposed layers. This arrangement is intended to minimize the risks of mechanical damage to the membrane in contact with the wall of the sample which is most often rough, when it is pressed against it through the insertion of the body via a hole in the sheath containing the sample.

According to an embodiment, the body comprises a threaded part for screwing it into the hole in the sheath. According to a preferred embodiment, the membrane is placed against the wall of the sample, at the bottom of the hole in the sheath, and it is pressed against the wall by screwing the body of the pressure tap into the sheath.

BRIEF DESCRIPTION OF THE DRAWINGS

Other features and advantages of the device according to the invention will be clear from reading the description hereafter of an embodiment given by way of non limitative example, with reference to the accompanying drawings in which:

FIG. 1 shows the pressure tap in contact with a solid porous sample, contained in a sealed enclosure, e.g., a sheath or case and FIG. 2 is a more detailed partial cross-section of an end ferrule of the pressure tap.

DESCRIPTION OF THE PREFERRED EMBODIMENTS

The pressure tap according to the invention allows selectively applies to an appropriate detector the pressure exerted by a fluid at a point in a porous solid sample containing at least two distinct fluids and located in a sealed case or sheath.

This pressure tap comprises (FIGS. 1, 2) an elongated body 1 provided with a central channel 2 and, over part of its length, an external thread 3 allowing the body to be screwed into a hole provided through the case or sheath 4 containing sample 5. The body 1 of the tap also comprises a ferrule 6 whose end face 7 is suited for pressing closely against a wall of sample 5, during the screwing operation, a semipermeable membrane 8 that is permeable to the fluid in question. The external end of the pressure tap opposite the ferrule comprises a connection means 9 of a pipe 10 allowing the central channel 2 to communicate with a pressure detector 11, and flat clamping surfaces 12.

Ferrule 6 is externally provided with O-ring seals 13. The end face 7 of the ferrule preferably has a concave shape. Its peripheral part 14 closely presses the semipermeable membrane 8 against the wall of the sample during the screwing of the pressure tap into its housing. Any possible leak between the pressure tap and its housing in the sheath 4 containing sample 5 that might cause it to lose its selective character is prevented thereby. This also allows the pressure tapping point to be very precisely defined.

According to an implementation mode, the semipermeable membrane is placed directly in the bottom of the cavity provided in the sheath prior to screwing the body of the pressure tap therein. Several semipermeable layers can be superposed in order to reinforce the semipermeable membrane, the peripheral part 14 of the end face 7 then pressing them together against the wall of the sample.

We claim:

1. A pressure tap for selectively applying to a pressure detector a pressure of a first fluid in a solid porous sample saturated with the first fluid and with at least one other second fluid through a hole in a wall of a sealed enclosure containing the sample, said pressure tap comprising an elongated body having at one end a ferrule with seal means and with an end face, an axial channel extending through the elongated body and opening in the end face, connection means for connecting the axial channel to the pressure detector, at least one semipermeable membrane permeable to the first liquid and means for tightly securing the pressure tap in the hole, said end face tightly pressing said at least one semipermeable membrane against the sample whereby the pressure of said first fluid is transmitted through the at least one semipermeable membrane.

2. A pressure tap according to claim 1, wherein the ferrule has an end face of concave shape with a peripheral part for pressing the at least one semipermeable membrane closely against a wall of the sample, so as to prevent any peripheral fluid leakage.

3. A pressure tap according to claim 1, wherein the at least one semipermeable membrane comprises several superimposed membranes.

4. A pressure tap according to claim 1, wherein the elongated body comprises a threaded part for screwing the body into the hole in the sealed enclosure.

5. A method for installing a pressure tap against a solid porous sample saturated with a first fluid and with at least one other fluid through a hole in a wall of a sealed enclosure containing the sample, said pressure tap comprising an elongated body having at one end a ferrule with seal means and with an end face, an axial channel extending through the elongated body and opening in the end face, connection means for connecting the axial channel to the pressure detector, at least one semipermeable membrane permeable to the first liquid and means for tightly securing the pressure tap in the hole, said method comprising positioning the at least one semipermeable membrane against the sample at a bottom of the hole in the enclosure and pressing the at least one semipermeable membrane against the sample by screwing the elongated body into the hole in the enclosure so that the end face presses against the at least one semipermeable membrane.

* * * * *